Oct. 6, 1970　　　O. W. RICHARDS　　　3,532,411
STEREOSCOPIC MICROSCOPE
Filed Jan. 18, 1968　　　　　　　　　　3 Sheets-Sheet 1
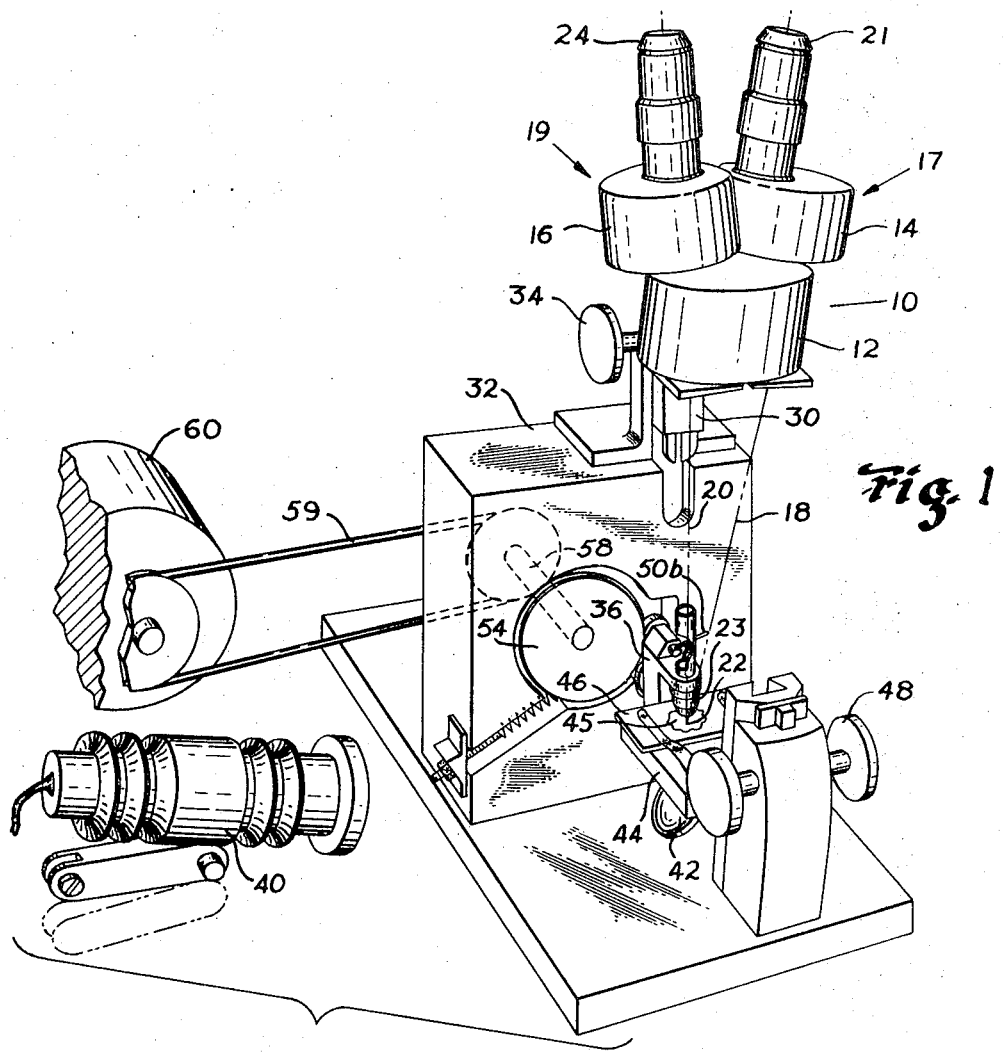
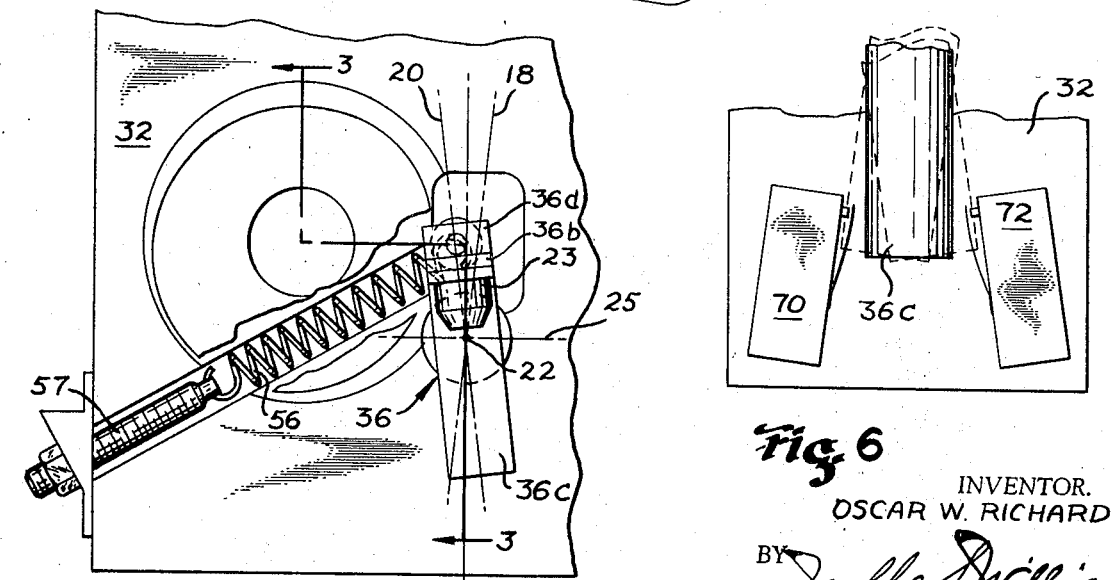
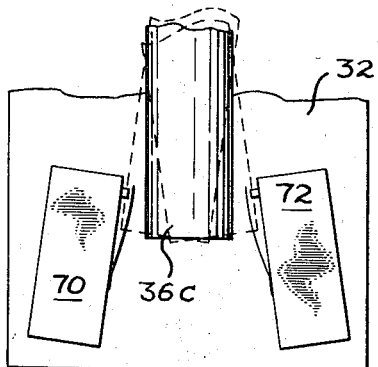
INVENTOR.
OSCAR W. RICHARDS
BY Noble J. Williams
ATTORNEY

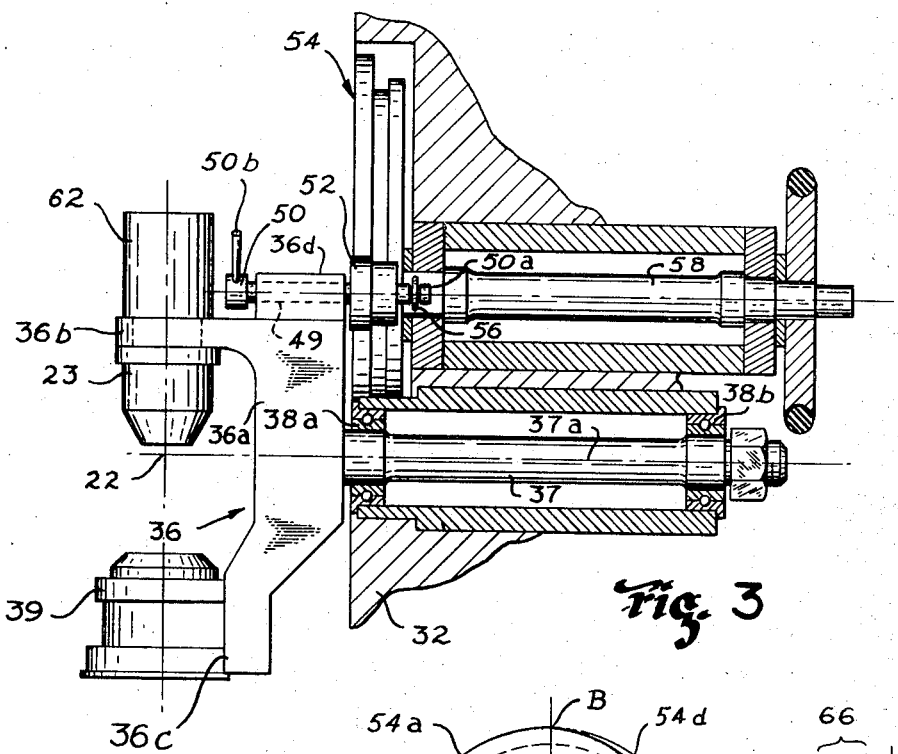
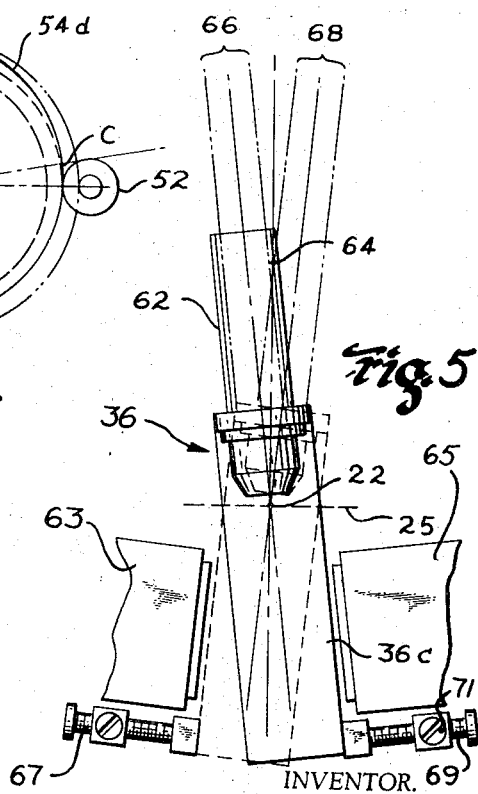
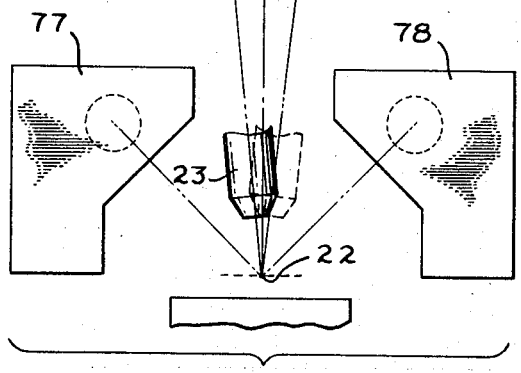
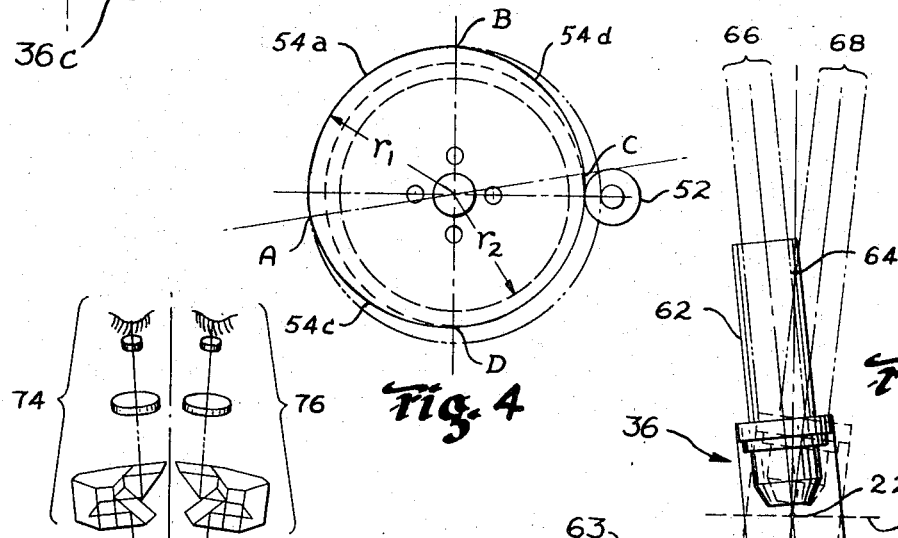
INVENTOR.
OSCAR W. RICHARDS
BY Robert F. Williams
ATTORNEY Oct. 6, 1970  O. W. RICHARDS  3,532,411
STEREOSCOPIC MICROSCOPE
Filed Jan. 18, 1968  3 Sheets-Sheet 3

INVENTOR.
OSCAR W. RICHARDS
BY Noble S. Williams
ATTORNEY

United States Patent Office 3,532,411
Patented Oct. 6, 1970

3,532,411
STEREOSCOPIC MICROSCOPE
Oscar W. Richards, Forest Grove, Oreg., assignor to American Optical Corporation, Southbridge, Mass., a corporation of Delaware
Filed Jan. 18, 1968, Ser. No. 698,787
Int. Cl. G02b 7/88, 21/20, 7/02
U.S. Cl. 350—34                           6 Claims

ABSTRACT OF THE DISCLOSURE

Stereoscopic microscope using a pair of convergent optical assemblies and single rapidly oscillated objective for providing binocular viewing with good resolution at low, intermediate and high image magnifications.

---

This invention relates to improvements in stereoscopic microscopes and the like, and more particularly relates to stereoscopic microscopes for providing three-dimensional perspective viewing of objects at low, intermediate and even high magnifications while affording good image resolution.

The advantages of stereoscopic microscopes are already well-known and instruments for providing three-dimensional perspective viewing of objects at relatively low image magnifications through two separate complete convergently arranged microscope optical systems are already in extensive use. However, when stereoscopic microscope images of an object field at high image magnifications have been desired heretofore, modified microscope arrangements have been necessary. One reason for this is that ordinarily a microscope optical system which provides high image magnifications has a relatively short working distance and, accordingly, in the usual stereoscopic microscope there was not enough room available to accommodate two complete optical systems using such high magnification objectives in side-by-side operative relation to each other.

One earlier form of stereoscopic microscope arrangement which has been employed in attempts to avoid such objectionable conditions as referred to above and still provide high image magnifications has used a single objective of large diameter in combination with a right-hand and a left-hand optical viewing system. In such an earlier arrangement, however, only one half of the objective lens was arranged to transmit light rays from the object field through one of the optical viewing systems while the other half of the objective lens was arranged to transmit light rays from the object field through the other viewing system. Thus, in such an earlier arrangement, the effective numerical aperture of the objective lens for each viewing system was only approximately one-half of that which might be expected for an equivalent objective when used upon a monocular microscope. And, of course, in such an earlier stereoscopic instrument, the resolving power provided at each eye image was materially reduced.

Another earlier modified arrangement which has been attempted for the purpose of providing stereoscopic images at high image magnifications has employed what may be thought of as a more or less conventional high-powered binocular microscope, but with the exception that a tiltable stage was provided and arranged to alternately assume first and second oppositely sloping observation positions. In this modified design a pair of rotating shutters was also employed and arranged to operate in synchronized relation to the tilting of the stage; the timing thereof being such as to interrupt the light rays being transmitted to each associated eye lens system while the stage was in motion and also while positioned for observation through the opposite eye lens system. While the full aperture of the objective, in this arrangement, was employed, nevertheless, the beam was divided into two halves by a beam splitter and only light rays of half strength, at best, alternately reach the viewer's eye. Furthermore, what is of more serious consequence is the fact that when objects on the stage of an instrument of this type are contained within a suspension fluid, for example, unacceptable conditions due to the rapid movement of the stage are encountered.

It has now been found, however, that by following the teachings of the present invention, such difficulties and objections to the earlier types of stereoscopic microscopes referred to above can be avoided while still being able to provide stereoscopic images at high image magnifications and with good image resolution. This is accomplished by the improved stereoscopic microscope of the present invention wherein a single objective (which may be of low, intermediate or high magnification) is employed, and is suitably movably mounted in the instrument in such a manner as to be rapidly displaced or oscillated back and forth between two different stationary operative positions alternately aligned with a left-hand optical viewing system and then with a similar right-hand optical viewing system which are suitably convergently arranged relative to each other. In fact, this is effected while the objective is continuously maintained at a fixed focal distance from a central point in the object field.

A person's eye-convergence for ordinary reading purposes is in the neighborhood of 8 degrees. While in some stereoscopic microscopes, a like convergence has been used heretofore in others in order to afford a greater depth perception, prism means have also been used in the left-hand and right-hand viewing systems which increased this convergence at the object field somewhat and in some cases, a total included angle of convergence of as much as 12 degrees has been used. Angles of convergence of such amounts are contemplated and cared for in the structure of the present invention.

Additionally, the improved stereoscopic microscope of the present invention is provided with an actuating mechanism for moving the single objective rapidly between its two oppositely tilted stationary operative positions and also for providing a suitable dwell period of comparatively long duration while in each operative position. Thus, all of the light rays being transmitted through the full aperture of the objective of the improved microscope during each dwell period will be allowed to pass to one and then the other of the two optical viewing systems and then to the image plane thereof. Accordingly, high image resolution will be provided.

Additionally, the light-condensing assembly of the improved microscope can be arranged, when desired, to move back and forth rapidly in unison with the movement of the objective while being continuously maintained in proper optical alignment therewith and in proper position so as to direct a concentrated beam of light onto the object field of the instrument during both dwell periods of the objective. While such a movable condenser assembly is essential when an objective of high image magnification is being employed, it is possible, at other times when objectives of lower magnifications are being employed, to use a stationary condenser assembly with satisfactory results.

Also, the improved stereoscopic microscope embodying the present invention may be so arranged that objects or specimens of both a transparent nature and an opaque nature may be stereoscopically viewed at whatever image magnification is desired and with high image resolution.

Additionally, the improved stereoscopic microscope employing the tiltable objective, or employing the tiltable objective and condenser assembly in combination, may be provided with suitable light-controlling means in such a manner that the light passing through one viewing system and them through the other will be alternately interrupted in rapid succession and in such timed relation to the movement of the objective, or objective and condenser assembly combined, that what appear to be continuous clear, sharp images in stereoscopic relief or three-dimensional perspective may be observed with good image resolution. Even movement within the specimen at the object field of the instrument may be observed and will not be affected in any way by the oscillating motion of the objective or of the objective and condenser assembly combined. This is accomplished, in effect, by the instrument providing a rapid series of images of live duration alternately to the left-hand viewing system and then to the right-hand viewing system at a rate which is rapid enough to avoid any "flicker" effect being present in the viewed images and while permitting binocular fusion of the images into a three-dimensional view. As is well known from the motion-picture industry, the rapidity of successive images to each eye should be 16 or more per second. Even though the images provided by the present invention will be alternately presented to the opposite eyes of the user of the instrument, nevertheless, when the rate is high enough to avoid flicker, good fusion will result.

It is, accordingly, an object of the present invention to provide a stereoscopic microscope, whether arranged for the viewing of transparent objects or opaque objects, having a tiltably movable objective arranged in combination with a convergently related left-hand and right-hand optical viewing system in such way as to be alternately disposed for an appreciable dwell period in an optically aligned relation with one of said systems and then with the other; said combination also including means for pivotally mounting said objective upon a fixed part of the instrument and means for rockably moving said objective back and forth in such rapid successive between extended dwell periods that two well-defined stereoscopically related images will be provided at the two image planes of the instrument. The improved arrangement and optical design are such that stereoscopic relief or three-dimensional perspective viewing of objects with good image resolution at low, intermediate, or even high image magnification will be provided the observer.

It is also an object of the invention to provide in such an improved stereoscopic microscope using a single movable objective a condenser assembly which is arranged to move in unison at all times with such a movable objective.

It is a further object of the present invention to provide, in conjunction with such a stereoscopic microscope employing a single movable objective and left-hand and right-hand viewing systems therefor, light-controlling means arranged to operate in such timed relation to the movement and dwell periods of said objective as to periodically allow or effect transmission of light alternately through the left-hand and then the right-hand optical system of the instrument; the movement and timing of said objective and of said light-controlling means being such that dwell periods of relatively long duration for said objective are provided in comparison to the periods of movement thereof.

Other objects and advantages of the invention will become apparent from the detailed description which follows when taken in conjunction with the accompanying drawings in which:

FIG. 1 is a perspective view of a stereoscopic microscope embodying the present invention;

FIG. 2 is an enlarged fragmentary view of a part of the structure of FIG. 1, parts thereof being broken away to better show details of construction;

FIG. 3 is a sectional view taken substantially upon section line 3—3 of FIG. 2 and looking in the direction of the arrows but additionally showing a movably mounted condenser assembly which might be used;

FIG. 4 is a detailed view of cam means for use in the structure of FIG. 1;

FIG. 5 is an enlarged view of a modified form of operating means for the movable objective of the microscope of FIG. 1;

FIG. 6 is a fragmentary view showing light-control means which may be used with the present invention;

FIG. 7 is a diagrammatic showing of a modified form of the invention intended for use in viewing opaque objects;

Figure 8:
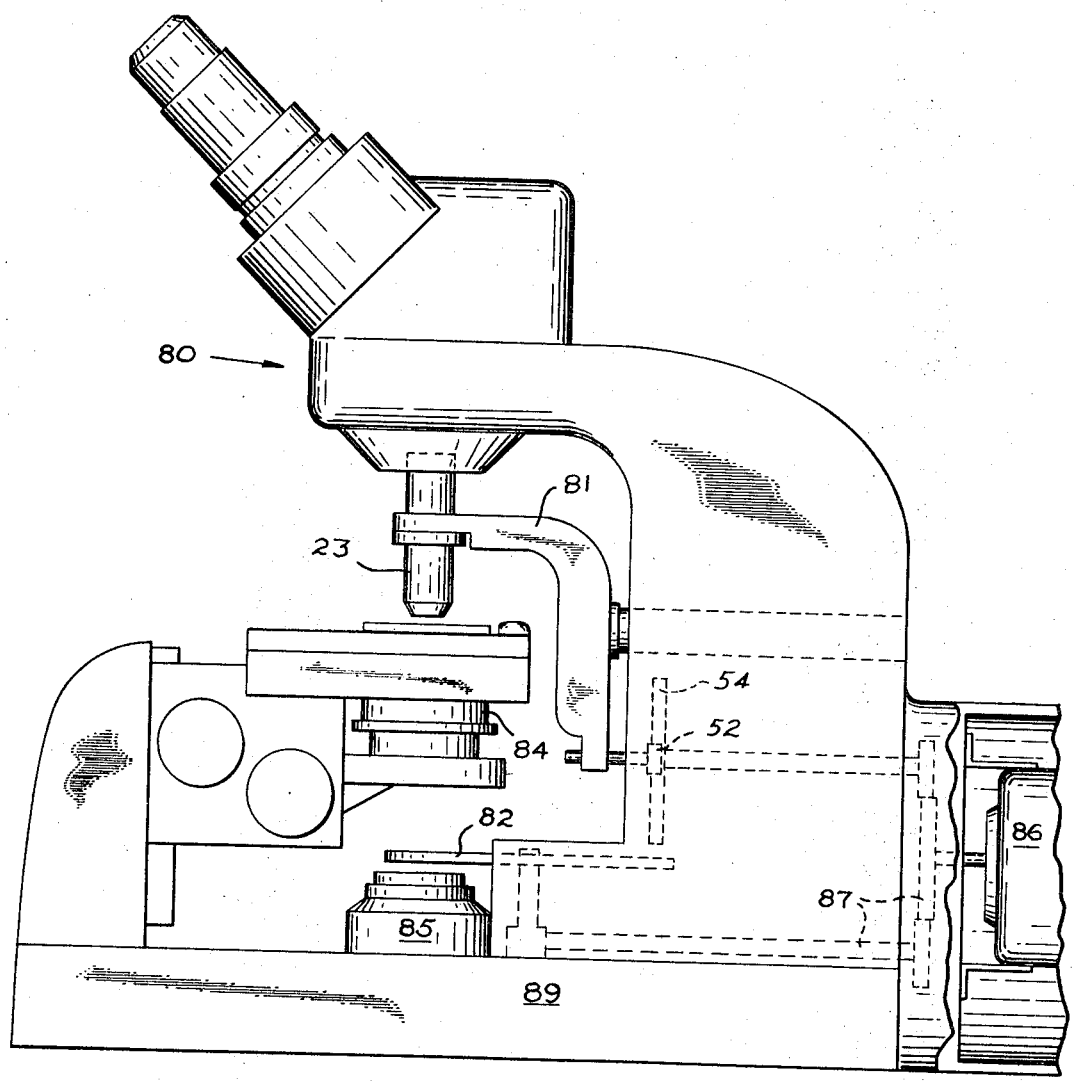
FIG. 8 is a side elevational view showing another modified form of the invention.

Referring to the drawings in detail and in particular to FIG. 1, it will be seen that the numeral 10 indicates generally a stereoscopic microscope embodying the present invention and comprising a main supporting body 12 carrying right-hand and left-hand housings 14 and 16 respectively thereon, each of which contains an assembly of optical components (not shown) convergently arranged relative to each other so as to have their respective optical axes 18 and 20 extending downwardly through openings in the bottoms of said housings and towards a common preselected intersection point 22. These two axes and said common point are also clearly indicated in FIG. 2.

This intersection point 22, it should be appreciated, is, in fact, located substantially at the focal plane of a single microscope objective 23 which is arranged to alternately face toward and be in optically aligned relation with said right-hand assembly of components and then with said left-hand assembly of components and together therewith effect right-hand and left-hand stereoscopic viewing systems 17 and 19 respectively. The opposite upper ends of said optical axes are shown extending outwardly through the eye lens systems 21 and 24, respectively, carried in tubes extending upwardly from the housings 14 and 16.

The main body member 12 in the showing of FIG. 1, is, in turn, carried by a support 30 which may be adjusted up and down relative to a heavy main supporting block 32 by manually operable means 34. of known kind. This adjustment, however, would ordinarily be a factory adjustment to bring the axes of the left-hand and right-hand viewing systems 17 and 19 into alignment with the axis of the objective 22 in its opposite operative positions and, accordingly, after this adjustment has been made, the control knob 34 would be "locked" in place or might even be removed from the structure. As stated above, the common point 22 of intersection of these two optical axes 18 and 20 is located substantially at the focal plane 25 of the objective 23, and the angle of convergence between axes 18 and 20 can be adjusted so as to provide hyper, ortho or hypo stereoscopic viewing of objects at this plane.

Accordingly, during operation of the instrument, image-forming light rays from an object at focal plane 25 transmitted by said single objective 23 will be directed on the long conjugate side thereof upwardly through the right-hand viewing system 17 or through the left-hand viewing system 19, depending, of course, upon which of the two opposite operative positions the objective 23 may be occupying at the time. At such times, no matter whether the objective being employed is of low magnifying power, or of intermediate power, or even of high power, it will be so located as to focus substantially at focal plane 25.

Light for illuminating an object or specimen at the object plane 25 will be transmitted, in the construction shown in FIG. 1, from a conventional microscope light source 40 generally horizontally to a reflecting concave mirror 42, which might even be of a diffusing type, and then upwardly through a substage condenser and aperture (not shown) in a microscope stage 44 to an object or specimen 45 ordinarily carried upon a conventional microscope slide 46 thereon. Manual means of known kind for vertically adjusting the height of the microscope stage 44 to bring the specimen into proper focus beneath objective 23 is indicated at 48.

In order that the objective 23 in the construction of FIG. 1 may be laterally tilted back and forth about a fixed axis 37a which extends substantially through common point 22, from one of its operative positions optically aligned with axis 18 to the other of its operative positions optically aligned with axis 20, and thus will be maintained in proper focus relative to point 22 at all times, a supporting bracket 36 is provided.

As better shown in FIG. 3, this bracket is secured to an elongated shaft 37 which is firmly but pivotally carried by bearing means 38a and 38b mounted in the main supporting block 32. An upper arm 36a of this bracket is provided with a forwardly extending portion 36b which is apertured and threaded for removably receiving the objective 23 in usual manner. Of course, any one of various different known ways of mounting and interchanging objectives of different powers upon the pivoted bracket 36 may be employed. An arm 36c is shown extending downwardly from bracket 36 below shaft 37 and this may be used, particularly when high power objectives are being employed, to movably support a condenser assembly 39 in aligned relation to the objective at all times.

Also carried upon the upper arm 36a of bracket 36 is a short projection 36d which is provided with a horizontally extending bore 49 within which is rotatably supported a control rod 50. An eccentric end portion 50a of this rod is arranged to rotatably support a small anti-friction roller 52 thereon and the opposite end of the control rod is provided with a control arm 50b. Small roller 52, in turn, is arranged to bear against a larger power-driven cam wheel means 54 and this is insured at all times by a coiled tensioned spring 56 which has one end thereof looped about the eccentric end portion 50a and the other end thereof secured to tension-adjusting means 57 carried by supporting block 32. A shaft 58 carries cam wheel means 54 and is rotatably supported in block 32. Thus, rapid rotation of cam wheel 54 by pulley and belt drive means 59 and electric motor 60 may be effected. Of course, this electric motor may be provided with variable speed control means (not shown).

As better shown in FIG. 4, cam wheel means 54 is so formed that a constant radius $r_1$ is provided therefor along a peripheral surface portion 54a between points A and B while a second surface portion of constant radius $r_2$, but of smaller value, is provided therefor along the peripheral surface portion 54b between points C and D. On the other hand, peripheral surface portion 54c between point D and point A and peripheral surface portion 54d between point B and point C are camming surfaces of constantly varying radii for effectively changing the positions of roller means 52 from one stationary operative position to the other. Radius $r_1$ and smaller radius $r_2$ are carefully controlled during the forming of cam 54 so that the difference therebetween will exactly equal that required for moving the axis of objective 23 from its alignment with convergent axis 20 to alignment with convergent axis 18. Of course, initial alignment between the axis of objective 23 and axis 20 is accomplished by control arm 50b.

The arrangement shown in FIG. 4, in fact, is such that surfaces 54a and 54b of constant radii each extends peripherally approximately 100 degrees while camming surfaces 54c and 54d each extends approximately 80 degrees. Thus, it will be appreciated that the time during which each constant surface 54a and 54b of the cam is operative, the objective 23 will be maintained in one of its stationary operative positions or the other and for the shorter periods of time during which the camming surfaces 54c and 54d are operative, the roller 52 will be moving under the influence of the cam and the spring 56 and will cause bracket 36 and objective 23 to move back and forth about axis 37a between such stationary operative positions. The results of such an arrangement are that an observer looking through the eye lens systems 21 and 24 of the microscope will receive image-forming light rays first through one eye lens and then through the other and these will provide slightly different effects to the object being stereoscopically viewed.

In order that a minimum of stray light will reach either optical assembly 14, or 16, during the period while the other optical assembly is operative, there is provided, as shown in FIG. 5, a tubular member 62 carried upon the supporting bracket 36 above the objective 23. This member is arranged in such a manner that the image-forming light rays of the beam passing through the objective will be transmitted to the optical assembly aligned therewith while all other light rays will be prevented at this time from reaching the other optical assembly. In order to insure this, the tubular tunnel 62 is made long enough to extend beyond the uppermost point of intersection of the left-hand and right-hand optical beams 66 and 68, respectively, as indicated at point 64.

In FIG. 5 is also shown a modified form of vibratory actuating means for rapidly moving the objective 23 back and forth from one of its operative positions to the other. This movement is accomplished by a pair of strong solenoids 63 and 65 which may be alternately energized by an electrical system like that indicated in FIG. 10. Adjustable bumpers 67 and 69 are shown in this figure for exactly limiting the travel of arm 35c and are provided with set screws 71 so as to be locked in place when set in proper adjustment.

Figure 10:
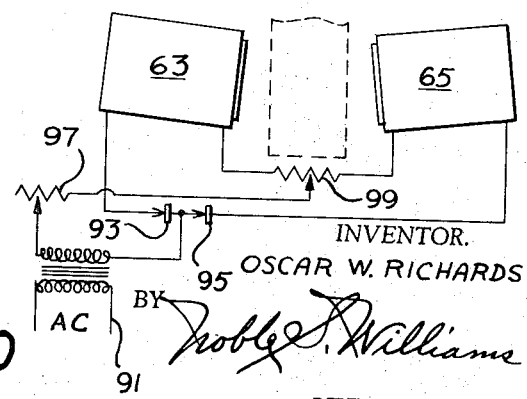
FIG. 10 is a wiring diagram for use with the operating means of FIG. 5.

Vibratory actuating means of the type above referred to are known and in FIG. 10 a wiring diagram for the alternate energizing of these two solenoids is given. A transformer 91 receiving current from a suitable AC source supplies through rectifiers 93 and 95 a rectified DC current first to one solenoid and then to the other. The amount of power being supplied may be varied by resistance 97 and the relative amounts being supplied to one solenoid or the other may be controlled by resistance 99.

While it is possible to use the stereoscopic microscope of the present invention with acceptable results without interrupting the light being transmitted to the user's eyes when the single objective is in motion, nevertheless, it is preferable to improve image definition by light-control means either in the form of opaque diaphragm means for interrupting the light during such objective motion or in the form of high intensity flash-tube type stroboscopic light source means arranged to supply light to the instrument only while the objective is in one of its operative positions and then the other. The latter may be of the type disclosed in the Handbook of Stroboscopy by Frederick Van Veen, published 1966 by General Radio Company, West Concord, Massachusetts, and such a high-speed light source could be readily synchronously controlled by suitable means such as a pair of switches 70 and 72 positioned, as indicated in FIG. 6, so as to be actuated into circuit-closing positions each time the objective 23 is moved into its opposite stationary operative position; each being "closed" by the movable lower free end portion 36c of pivoted bracket 36. The result of this action is that light at such time will be transmitted to the stage of the microscope and then into the stationary objective and on through the optical viewing system aligned therewith. However, during substantially all of the interval during which the objective 23 is being moved from one operative position to its other operative position, the light source will be inactive. Thereafter, the other switch will be closed and light will pass through the objective 23 in its other stationary position and through the other optical viewing system. Thus, blurring and loss of contrast, due to unwanted stray light through either optical assembly, will be avoided.

In FIG. 7 is indicated diagramatically a stereoscopic microscope optical system, modified to accommodate opaque objects, and employing left-hand and right-hand optical assemblies of lens and image-erecting means 74 and 76 optically adapted to be aligned with the objective 23 while focused at common axial point 22. (While image-erecting means 74 and 76 are here shown and might be used in any microscope embodying the invention, nevertheless, same are not essential thereto.) In this arrangement of FIG. 7, however, wherein the object under observation is opaque, left-hand and right-hand light source means within lamp housings 77 and 78 are shown. When an instrument on this type is employed, the light source means therefore may be alternately energized as by stroboscopic means as mentioned above in such a way as to light the opaque object from one side and then from the other only during the period when the objective 23 is in one stationary operative position or the other. Or, it would be possible to light both sides during each stationary period, if desired.

Figure 9:
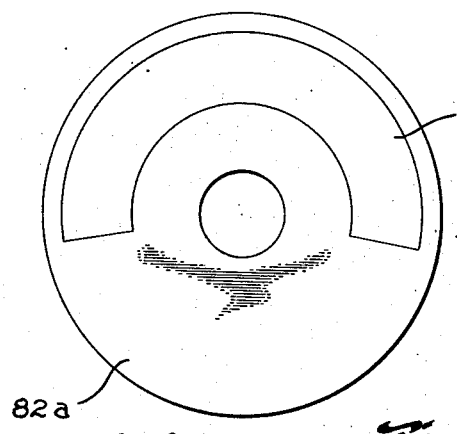
FIG. 9 is a view showing light-control means for use in the structure of FIG. 8.

Furthermore, as indicated by FIG. 8 wherein a modified form of stereoscopic microscope intended for use with transparent objects is indicated generally at 80, there is indicated not only mechanical means 81, more or less like that shown at 52 and 54 in FIGS. 3 and 4, for rapidly moving the objective 23 back and forth for alternate alignment with the right-hand and then the left-hand viewing system but also mechanical means in the form of an aperturad rotable diaphragm 82 and associated shaft and gear drive means 87 coupled to an electric motor 86 and arranged to be synchronously rotated in timed relation to the back-and-forth movement of objective 23. This rotatable diaphragm 82, also shown in FIG. 9, is provided with an aperture 63 of appreciable arcuate length through which the condened light beam from a substage condenser 84 and a light source 83 will pass while objective 23 is in each of its tilted stationary operative positions. On the other hand, while the objective is being moved from one stationary operative position to the other, the opaque portion 82a of this diaphragm will be positioned so as to interrupt the illumination beam. If an objective of higher magnification is used, it might be desirable here also to oscillate the condenser 84 and such could be done by securing same to the lower end of arm 81.

Preferably, the arrangement will be such that diaphragm 82 will make two revolutions in suitably timed relation with one complete back-and-forth operating cycle of the movable objective 23. Of course, the speed at which the driving motor 86 is normally being operated will be such as to produce a series of dwell periods for the objective in each of its stationary operative positions at a sufficiently high rate of speed to be above the normal persistence of vision of the user of the microscope. Ordinarily, this will be more than 16 exposures a second while in each operative position. An even higher rate might even be preferred. Preferably, the rotatable diaphragm 82 and also the supporting arm 81 for the movable objective 23 and condenser, if used, will be arranged or weighted so as to be as well dynamically balanced as possible, and thereby cause a minimum of vibration within the instrument. Also, the base 89 of the instrument is made heavy so as to reduce vibration within the optical systems of the instrument.

Instead of using a cam means or solenoid means of the types here shown for reciprocating the objective 23, it would be an easy matter to employ a motor-driven Geneva mechanism for the purpose. (Such are well-known in the motion-picture industry.) In fact, such a Geneva mechanism might even be arranged to open and close a shutter mechanism in timed relation to the movement and dwell periods of the movable objective.

Again referring to FIGS. 1 and 3, it should be appreciated that lateral adjustment of control arm 50b in one direction or the other may be used to initially tilt the axis of objective 23 into precise alignment with convergent axes 18 and 20. Also, this control will be useful for adjustments later on should any wear occur between the cam and roller surfaces due to use of the instrument.

Having described my invention, I claim:

1. A stereoscopic microscope comprising a single objective, a left-hand and a right-hand optical assembly each comprising lens means disposed in common optical alignment along first and second optical axes, respectively, said optical axes being convergently disposed at a predetermined stereoscopic angle relative to each other and intersecting each other at a common axial point, means pivotally supporting said objective substantially at a fixed distance from said common axial point while being movable between first and second stationary positions operatively aligned with said left-hand and said right-hand optical assemblies, respectively, said fixed distance being such as to focus said objective upon an object field disposed substantially at said common axial point, and to direct image-forming light rays when said objective is in each of said aligned operative positions through the optical assembly aligned therewith to left and right image planes respectively of said microscope light source means for illuminating said object field, and actuating means operatively connected to said objective supporting means to rapidly intermittently move said objective back and forth from one of said aligned operative positions to the other during each complete operating cycle, and to provide a dwell period of appreciable duration between successive movements of said objective, said actuating means moving said objective through said complete cycle at least as rapidly as 16 times per second, whereby left and right stereoscopically related images of an object at said object field will be alternately provided a person during use of said microscope.

2. A stereoscopic microscope as defined in claim 1 and wherein said actuating means includes a continuously rotating element and spring means operatively connected so as to oscillate said objective back and forth between said first and second stationary operative positions at a rate of speed which is at least high enough to provide at the image planes of said microscope a series of stereoscopically related images which will appear to the user of the microscope clear and continuous.

3. A stereoscopic microscope as defined in claim 1 and wherein said actuating means for moving said objective is in the form of a pair of alternately electrically energized solenoids operatively connected to said supporting means.

4. A stereoscopic microscope as defined in claim 1 and wherein light-control means is provided and operated in such timed relation to the rapid back-and-forth movement of said objective as to cause light rays to pass from said object field through said objective and through one of said optical assemblies to the image plane aligned therewith substantially only while said objective is in a stationary position optically aligned therewith.

5. A stereoscopic microscope as defined in claim 4 and wherein said light-control means includes electrical timing means operatively connected to said microscope in such a manner as to allow said light source means to operate only while said objective is in one or the other of its stationary aligned positions.

6. A stereoscopic microscope as defined in claim 4 and wherein said light-control means is in the form of opaque shutter means arranged to interrupt light rays travelling toward said image planes at all times except while said objective is substantially in one or the other of its stationary aligned positions, and said light-control means is provided with an aperture for alternately allowing the passage of light to each of said image planes when the objective is aligned therewith.

References Cited

UNITED STATES PATENTS

| | | | |
|---|---|---|---|
| 1,500,030 | 7/1924 | Ott | 350—35 XR |
| 1,679,661 | 8/1928 | Hugershoff | 350—30 XR |
| 2,224,775 | 12/1940 | Bartow | 350—145 |
| 3,101,644 | 8/1963 | Henriquez | 350—169 XR |

FOREIGN PATENTS 844,702     1960    Great Britain.

PAUL R. GILLIAM, Primary Examiner

U.S. Cl. X.R.

350—36, 71, 130, 144